United States Patent [19]

Rapp

[11] 4,238,877
[45] Dec. 16, 1980

[54] FABRICATION OF SCREEN DEVICES

[75] Inventor: Willard E. Rapp, Griggstown, N.J.

[73] Assignee: Western Electric Company, Inc., New York, N.Y.

[21] Appl. No.: 972,633

[22] Filed: Dec. 22, 1978

[51] Int. Cl.³ .............................................. B29F 3/00
[52] U.S. Cl. ................................ 29/402.11; 425/185; 210/387; 210/390
[58] Field of Search ............... 425/185, 186, 197, 199; 264/176 R; 210/232, 233, 387, 390, DIG. 15; 29/402.01, 402.03, 402.09, 402.11, 402.19; 140/107, 109

[56] References Cited

U.S. PATENT DOCUMENTS

| | | | |
|---|---|---|---|
| 2,661,497 | 12/1953 | Birmingham | 425/185 |
| 3,007,199 | 11/1961 | Curtis | 425/185 |
| 3,059,276 | 10/1962 | Yokana | 425/185 |
| 3,661,188 | 5/1972 | Gaug | 140/109 |
| 3,804,758 | 4/1974 | Cooper et al. | 210/DIG. 15 |
| 3,856,277 | 12/1974 | Tiramani | 425/185 |
| 3,971,721 | 7/1976 | Fogarty, Jr. | 425/197 |
| 4,021,346 | 5/1977 | Berthiaume | 210/DIG. 15 |
| 4,080,297 | 3/1978 | Yoshida | 210/387 |
| 4,082,487 | 4/1978 | Rapp | 425/185 |

*Primary Examiner*—Lowell A. Larson
*Attorney, Agent, or Firm*—M. Pfeffer

[57] ABSTRACT

Screen devices for use with an automatic screen changer (10) of an extruder (11) are fabricated from a screen preform (32) including an elongated carrier strip (36) having a plurality of screen elements (33—33) connected thereto. The screen changer (10) includes a pair of recesses (21,22) for receiving screen devices and is movable between a first position in which one recess is in the path of the extrudate (11) while the other recess is outside the path thereof and a second position in which the dispositions of the recesses is reversed. While a recess (21 or 22) is outside of the path of the extrudate, a used, clogged screen device is ejected therefrom and a new screen device is fabricated, in situ, therein. The screen device is fabricated by feeding the preform (32) between a punch (54) and the recess. The punch (54) is then actuated to sever an element (33) from the preform (32) and in the same motion insert it into the recess.

9 Claims, 7 Drawing Figures

FABRICATION OF SCREEN DEVICES

TECHNICAL FIELD

The present invention relates to the fabrication of screen devices and, more particularly, to the fabrication of screen devices for screen changers associated with plastic extruders.

BACKGROUND OF THE INVENTION

The use of screen devices for filtering extruded plastic material is well known. Screening is particularly useful when extruding recycled plastics in order to remove particles of dirt or foreign matter from the recycled material. Screen devices, however, are particularly subject to clogging when utilized in plastics recycling operations. Accordingly, the changing of screen devices at frequent intervals is necessary.

Mechanisms for changing screen devices associated with plastic extruders are well known. Typically, such a mechanism may include a slide assembly which moves a clean screen device into the path of the extrudate as it moves the used, clogged screen device to a standby station where it is replaced. The replacement should be done relatively rapidly so that a clean screen device is always available for insertion into the extruder. In fact, automatic replacement would be quite desirable, not only to minimize the replacement time, but also to minimize any inconvenience associated with manual replacement. However, with one exception, all of the known screen changers effect replacement of the dirty screen devices manually. The one exception is the automatic screen changer of my prior U.S. Pat. No. 4,082,487 which automatically ejects a used, clogged screen device and replaces it with a clean screen device.

While this automatic screen changer overcomes the problems associated with manual replacement of clogged screen devices, it, like the manual machines, requires the use of discrete screen devices, each of which typically includes a housing containing one or more screen elements and each of which must be uniquely configured in accordance with its intended use. More specifically, the dimensions of each screen device are determined by the apparatus with which it is to be used, while the number of screen elements included in each device and the mesh of each element are determined in accordance with the type of extrudate and the desired degree of filtering thereof.

Generally, these requirements present little, if any problem. Where, however, an installation employs different sizes of extruders and/or screen changers, or will be used to filter extrudates having varying filtering requirements, many different sizes and types of screen devices may have to be stored, with the attendant high cost and inconveniences usually associated with the stockpiling of different parts.

SUMMARY OF THE INVENTION

All of the problems discussed above are overcome by the present invention which, in accordance with one aspect thereof, contemplates a screen preform comprised of an elongated carrier strip having a plurality of screen elements connected thereto. Preferably, each screen element is attached to the next adjacent filter element and includes a plurality of tabs having first and second ends, the first ends being integral with the filter element and the second ends of some of the tabs being connected to the carrier strip and the second ends of the other of the tabs being attached to the next adjacent filter element. All of the tabs are adapted to be severed at their second ends to form a free screen element, the tabs of which are adapted to secure the screen element within a housing.

In accordance with another aspect of the invention, a screen device is fabricated from the preform by positioning the carrier strip relative to a housing such that one of the screen elements is aligned with the housing. The aligned screen element is then detached from the strip and inserted into the housing. If a multi-element screen device is desired, the carrier is repeatedly positioned relative to the housing to align successive screen elements therewith which are then detached and inserted into the housing.

Preferably, the invention is employed to replace the used, clogged screens of a slide assembly of the type previously mentioned which is used to filter the extrudate of a plastics extruder. The slide assembly includes first and second screen receiving recesses and is movable between first and second positions. In the first position, the first recess is outside of the path of the extrudate at a first standby station, while the second recess is in the path of the extrudate; in the second position, the second recess is outside of the path of the extrudate at a second standby station, while the first recess is in the path of the extrudate. In accordance with certain aspects of the present invention, clogged screens are replaced at each standby station by respectively feeding into each station a screen preform of the type previously described such as to align one of the screen elements with a recess positioned in the station. At each station, an aligned element is removed from its carrier strip and inserted into a recess to thereby form, in situ, a screen device in the recess. Multi-element devices may be formed by repeating the feeding, removing and inserting operations as many times as desired while a recess is positioned at a station.

Preferably, the elements are removed and inserted into the recesses by a punching operation in which a punch severs a screen element from its carrier strip and, in the same motion, inserts the element into the recess.

DETAILED DESCRIPTION

Figure 1:
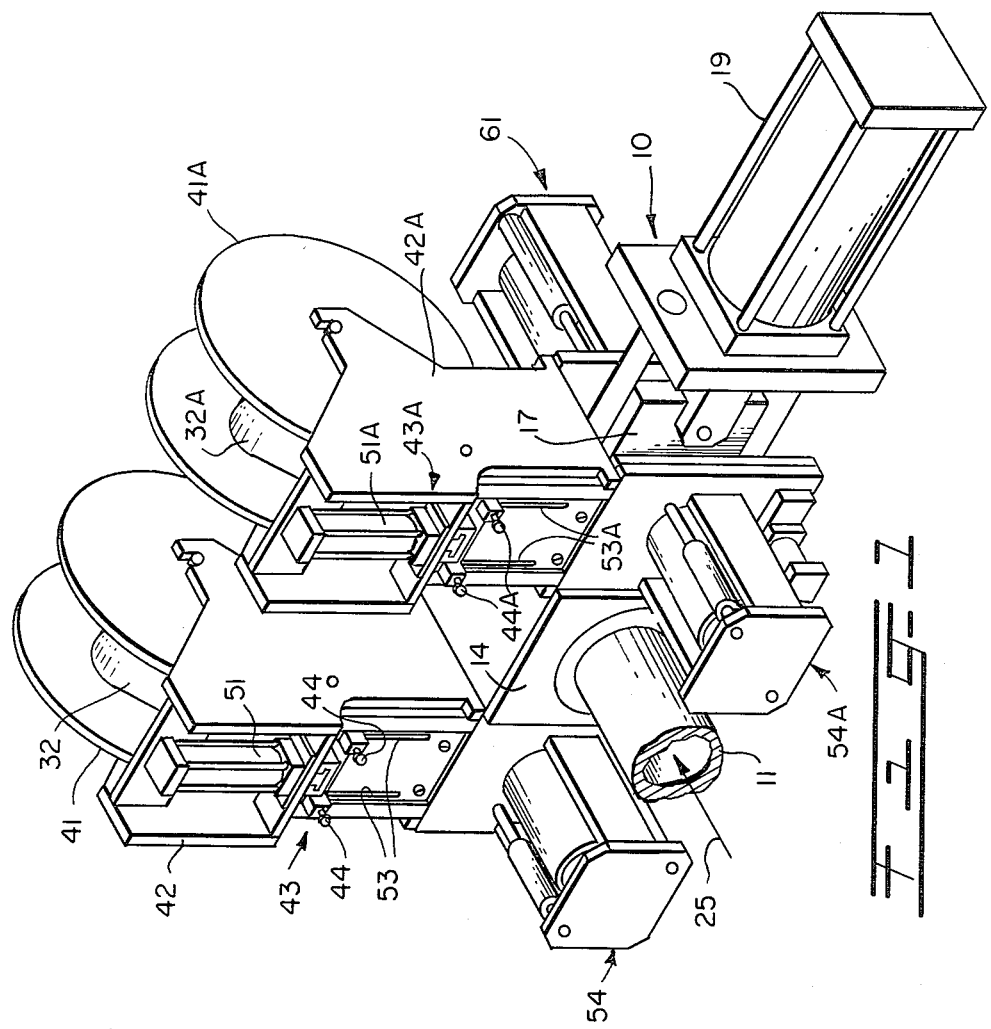
FIG. 1 is an isometric view of apparatus illustrating certain principles of the invention for fabricating screen devices, in situ, in a screen changer used with a plastics extruder.
Figure 2:
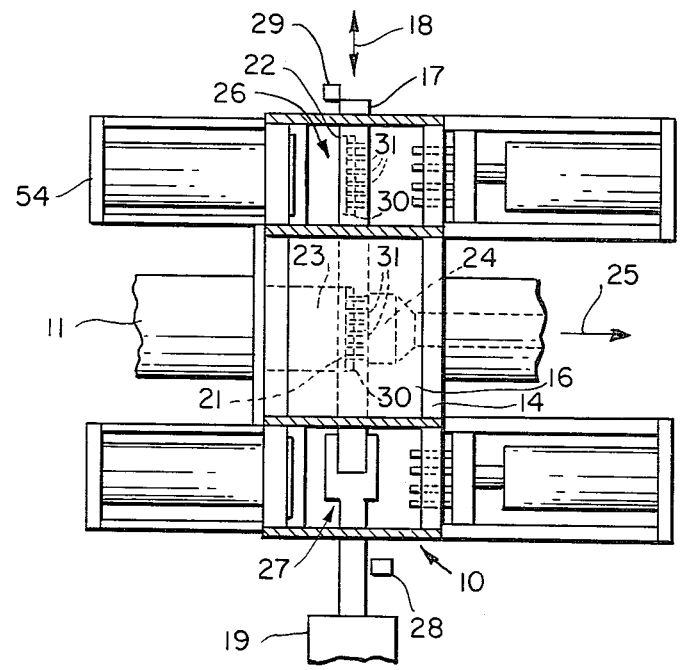
FIGS. 2 and 3 are, respectively, plan and end elevational views, partly in section and with parts removed and broken away for the sake of clarity, of the apparatus of FIG. 1.

Referring first to FIGS. 1 and 2, the invention is preferably employed in forming screen devices for a screen changer 10 which functions to simultaneously insert a clean screen device into the extrudate issuing from a plastics extruder 11 to filter out foreign matter as it removes a used, clogged screen device from the path of the extrudate. The screen changer 10 is of a type similar to that disclosed in my U.S. Pat. No. 4,082,487. The screen changer may, as shown, be a separate unit, mounted at a discharge end of the extruder 11 or, alternatively, it may be an integral part of the extruder.

Typically, the screen changer 10 includes a slide assembly housing 14 which surrounds a slide chamber 16 (FIG. 2). A slide assembly 17 is adapted for reciprocating sliding movement within the slide chamber 16, in directions indicated by the arrow 18 (FIG. 2), under the control of a piston and cylinder assembly 19. The slide assembly 17 includes first and second spaced, apertured recesses 21 and 22, respectively, each of which recesses is adapted to retain a screen device therein (not shown).

In a first position of the slide assembly 17 (FIGS. 1 and 2), the first recess 21 is so located within the slide chamber 16 (FIG. 2) as to be aligned between an inlet opening 23 and an outlet opening 24 of the slide assembly housing 14 along a direction of advance or discharge of extruded plastic material from the extruder 11, identified by an arrow 25 in FIGS. 1 and 2 of the drawing. Meanwhile, the second recess 22 in the slide assembly 17 is located outside of the slide assembly housing 14 at a first side thereof, in a first standby station 26. In a second position of the slide assembly 17 (not shown), the second recess 22 is so located within the slide chamber 16 as to be aligned between the inlet and outlet openings 23 and 24 of the slide assembly housing 14 along the direction of advance or discharge indicated by the arrow 25. Meanwhile, the first recess 21 in the slide assembly 17 is located outside of the slide assembly housing 14 at a second side thereof, in a second standby station 27. A pair of limit switches 28 and 29 (FIG. 1) may be employed, in conventional manner, to indicate that the slide assembly 17 is in its first position or its second position, respectively. The recesses 21 and 22 are provided with respective breaker plates or inserts 30—30, each of which includes a plurality of openings 31—31. The breaker plates 30—30 prevent screen devices from collapsing as a result of the high pressures encountered in the extrudate stream.

Figure 4:
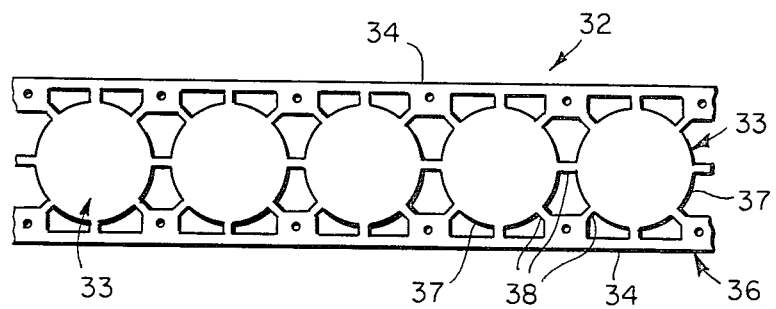
FIG. 4 illustrates a screen preform in accordance with certain principles of the invention from which screen devices may be fabricated by the apparatus of FIGS. 1–3.
Figure 5:
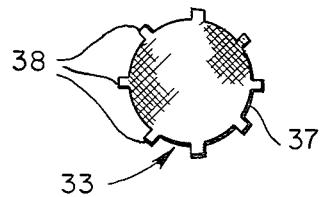
FIG. 5 illustrates one of the screen elements of the screen preform of FIG. 4 after being removed therefrom.

In accordance with the present invention, screen devices are formed, in situ, in the recesses 21 and 22 from a screen preform 32 (FIG. 4). As seen in FIG. 4, the preform 32 includes a plurality of screen elements 33—33, connected serially between a pair of sidepieces 34—34 of a carrier strip 36. Each screen element 33 includes a circular filtering portion 37 of essentially the same diameter as the recesses 21 and 22, but slightly smaller, so that the elements may be inserted into a recess and snugly received therewithin. Each screen element 33 also includes a plurality of radiating tabs 38—38, some of which are integral with tabs radiating from the next adjacent element 33 and others of which are integral with the sidepieces 34—34. As will be more fully discussed below, at each standby station, an element 33 is severed from the preform 32 at the tabs 38—38 by a punching operation to form a free screen element (FIG. 5) which is then inserted into one of the recesses 21 or 22. The tabs 38—38, as will also be more fully described below, function to retain the element within the recess 21 or 22.

Preferably, the preform 32 is fabricated from a stock of suitable screen material by a punching operation. A plurality of holes 39—39 formed in the sidepieces 34—34 of the preform 32 are employed in indexing of the stock during the punching operation.

Any material which can be punched and which is not affected by the material being extruded may be used for the preform 32. For example, the preform 32 may be fabricated from steel wire cloth.

At each standby station, used, clogged screen devices are ejected from the recesses 21, 22 and new screen devices are fabricated, in situ, therein from lengths of the preform 32. The various mechanisms at the first and second standby stations 26 and 27 for feeding lengths of the preform 32, for ejecting used, clogged screen devices and for forming screen devices are identical. Accordingly, only one such station, the first screen-changing station 26, will be described in detail hereinafter. Corresponding elements at the second standby station 27 are designated in the drawing by the same reference numerals, followed by the suffix A.

Figure 3:
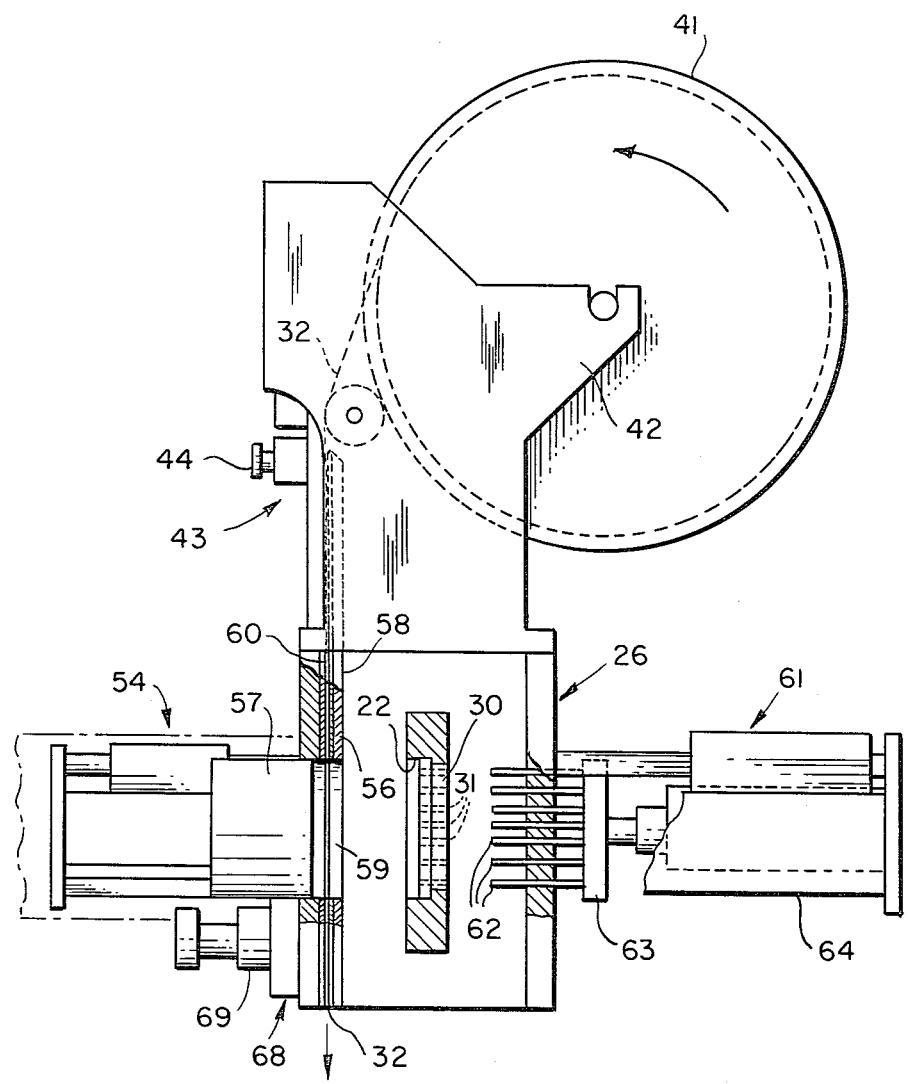

Referring now to FIGS. 1 and 3, a roll 41 of the preform 32 is rotatably mounted on a cradle rack 42 affixed to the top of the housing 14. A feeding mechanism, designated generally by the reference numeral 43, pays off the preform 32 from the roll and incrementally feeds it downward such that one of the elements 33—33 is aligned with the recess 22 when the recess is at the standby station.

Figure 6:
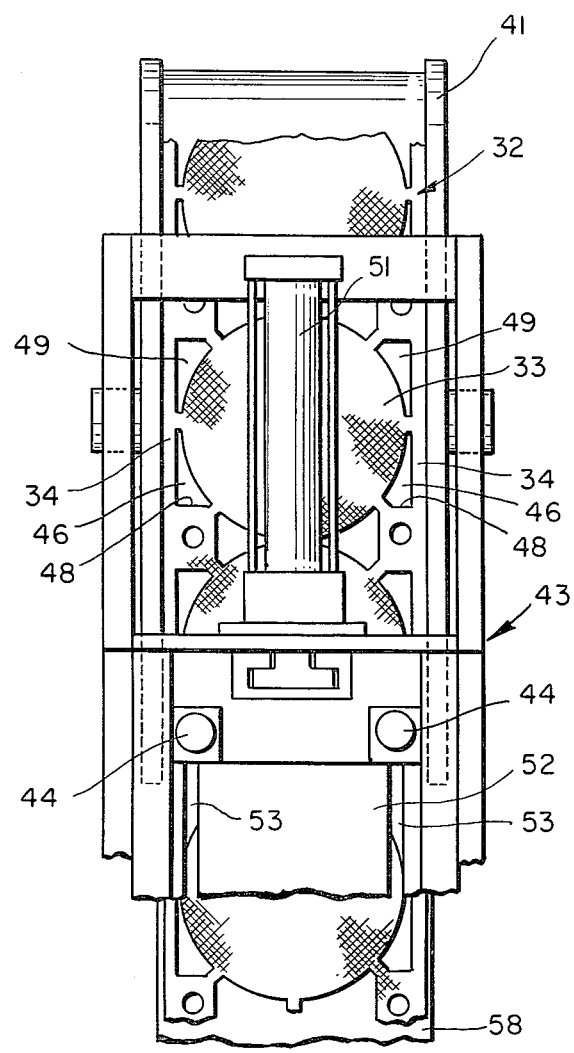
FIG. 6 is a front elevational view, greatly enlarged and with parts broken away and removed for the sake of clarity, of a portion of the apparatus of FIG. 1, showing in particular a feeding mechanism thereof.
Figure 7:
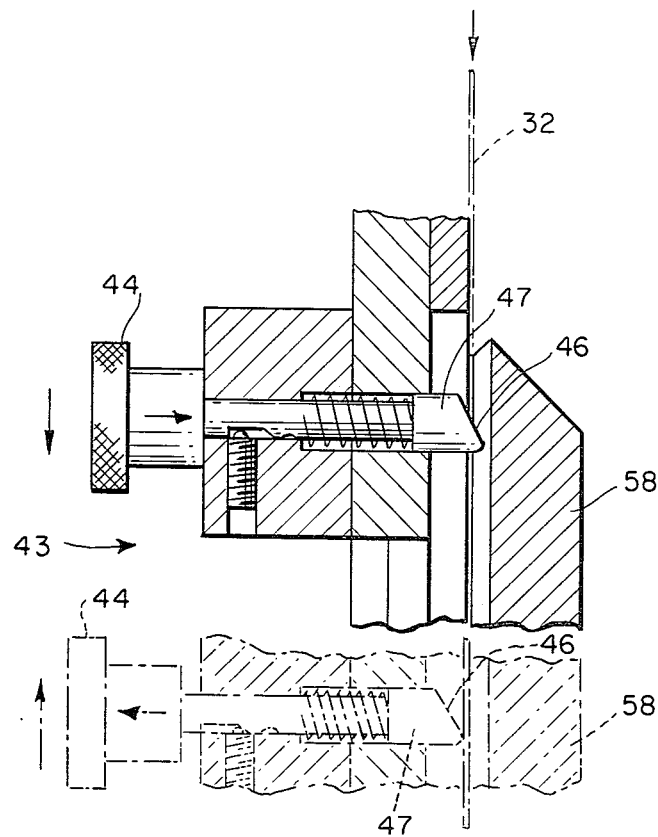
FIG. 7 is an end elevational view of the feeding mechanism of FIG. 6, showing the mechanism in solid lines in one position thereof and in phantom lines in another position thereof.

As best seen in FIGS. 6 and 7, the feeding mechanism 43 includes a pair of spring loaded plungers 44—44, which are horizontally movable into a pair of lower slots 46—46 (FIG. 6) formed between the lower portion of each screen element and the adjacent portions of the sidewalls 34—34. The plungers 44—44 are spaced apart by a distance less than the width of the preform such that one of the plungers 44 enters the slot 46 on one side of an element and the other plunger enters the slot on the other side thereof. The ends 47—47 of the plungers 44—44 are dimensioned to enter the slots 46—46 only at their widest portions.

With the plungers 44—44 in the slots 46—46, downward movement thereof causes the plungers 44—44 to bear against the leading edges 48—48 of the slots, thereby causing downward movement of the preform 32. The plungers 44—44 are moved downwardly a distance equal to the distance between elements 33—33 to thereby move a new element into the station 26 for each successive downward movement of the plungers. After each downward movement, the plungers 44—44 are moved upwardly. The top surface of the ends 47—47 of the plungers are inclined upwardly so that, as seen in phantom in FIG. 7, when the plungers are moved upwardly through the slots 46—46, which become increasingly narrower from bottom to top, the plungers are caused to move out of the slots by camming action and to ride up thereover, the spring loading maintaining the plungers in contact with the preform. The plungers 44—44 are moved upward a distance essentially equal to the distance between the elements 33—33, whereupon at the uppermost point of their travel, the plungers enter the slots 46—46 associated with the next upwardly adjacent screen element. It should be noted that the plungers 44—44 will momentarily enter the upper slots 49—49 associated with the element 33 just engaged; however, the continued upward movement of the plungers, combined with their inclined top surfaces, will cause the plungers to ride out of the slots 49—49, the plungers thereupon continuing their upward movement until they drop into the bottom slots 46—46 of the next element to be engaged.

The plungers 44—44 are moved upwardly and downwardly by an air cylinder-piston assembly 51 vertically mounted in the front of the cradle. A cover plate 52 connected between the sidewalls of the cradle is provided for limiting horizontal movement or play of the preform during feeding. The cover plate 52 includes a pair of vertical, guide slots 53—53 through which the plungers 44—44 move.

Referring now to FIGS. 2 and 3, at the first standby station 26, a horizontally mounted, pneumatic punch 54 and a cooperating die 56 are provided for removing an element 33 from the preform 32 and for inserting the element into the recess 22 when the same is located at the station in alignment with the punch and die. The punch 54 includes a cylindrically shaped piston 57 having the same diameter as that of an element 33. The die 56 has an opening 59 which is similarly shaped and dimensioned. The die 56 is supported in a support plate 58 which is positioned relative to the front wall of the slide assembly housing 14 such as to form a passageway 60 for the feeding of the preform 32 between the punch 54 and the die 56. The punch 54, upon actuation, engages the element 33, severs it from the carrier strip 36 and then, in the same motion, inserts the severed element into the recess 22.

The element 33 (FIGS. 4 and 5) is severed from the carrier strip 36 by shearing the tabs 38—38 associated therewith such that the tabs of a detached element protrude slightly beyond the periphery of the central portion 37. As indicated above, the function of the tabs 38—38 (which it should be noted are shown greatly exaggerated in size for the sake of clarity) is to secure the element 33 within the recess 22. More specifically, as the screen element 33 is inserted into the recess 22, the tabs 38—38 are bent and thereby lock the element in place by spring action.

Prior to inserting a screen element 33 into the recess 22, it is necessary to remove any used, clogged screen elements 33—33 therefrom. To this end, a screen ejection mechanism 61 is provided. The screen device ejection mechanism 61 includes a number of projecting fingers 62—62 connected to the piston 63 of a piston and cylinder assembly 64. The fingers 62—62 are movable through the openings 31—31 of the breaker plate 30 into the recess 22 to engage and eject a used, clogged screen device therefrom. The entry of the fingers 62—62 into the recess 22 to eject a used, clogged screen may be initiated by a screen-change signal from the limit switch 29, i.e., a signal that the slide assembly 17 has entered into its first position, as illustrated in FIG. 1. The screen-change signal may be applied through any conventional electro-pneumatic or electro-hydraulic control mechanism (not shown) to actuate the second piston and cylinder assembly 64.

After an element 3 is severed from the carrier strip, the strip may be advanced to a take-up spool or, alternatively, may be advanced, as shown in FIG. 3, to a chopping station 68 where a pair of ganged, spaced punches 69—69 (only one of which can be seen in FIG. 3) is repeatedly operated to engage and chop up the sidepieces 34—34 of carrier strip 36 to facilitate disposal thereof.

The operation of the apparatus will next be described in detail with reference to a single cycle of operations, beginning with the slide assembly 17 entering into its first position (FIGS. 1 and 2). The extrusion mechanism 11 is currently functioning to discharge an extruded plastic material along the direction of the arrow 25 in FIGS. 1 and 2 of the drawing. Thus, the extruded plastic material may now begin to advance from the inlet opening 23 in the slide assembly housing 14 (FIG. 2) through a clean screen device retained within the first recess 21 in the slide assembly 17, such that a filtered plastic material may pass through the apertures 31—31 and exit through the outlet opening 24 in the slide assembly housing 14.

Meanwhile, as the slide assembly 17 enters into its first position, the limit switch 29 is operated, generating a screen-change signal indicative of such repositioning of the slide assembly 17. This is the condition indicated in FIGS. 1-3 of the drawing.

The screen-change signal generated by the limit switch 29 actuates the piston and cylinder assembly 64, causing the screen device ejection mechanism 61 to move to the left, as viewed in FIG. 3. This extends the projecting fingers 62—62 through the apertures 31—31 in the slide assembly 17 and into the second recess 22, forcing any used screen elements 33 to fall from the second recess 22 into a suitably positioned receptacle. The piston and cylinder assembly 64 thereupon completes its cycle of operation by withdrawing the screen device ejection mechanism 61 toward the right to the position shown in FIG. 3.

The feeding mechanism 43 is next operated to index the preform 32 downwardly to locate an element 33 between and in alignment with the punch 54 and the recess 22.

The punch assembly 54 is now operated to sever the aligned element 33 and to insert it into the recess 22, thereby forming a single element screen device in the recess 22. If a multi-element screen device is desired, the preform 32 is repeatedly indexed and successive screen elements 33—33 are removed therefrom and inserted into the recess 22.

After each indexing of the preform 32, the punches 69—69 are operated to chop up the remaining portions thereof (i.e., the sidepieces). A suitable receptacle (not shown) is provided for receiving the chopped-up pieces.

At a suitable time, an operation of the piston and cylinder assembly 19 is initiated, causing the slide assembly 17 rapidly to enter into its previously described second position. The new screen device within the second recess 22 in the slide assembly 17 thereupon commences immediately to filter out further foreign matter from the extruded material, with the first recess 21 in the slide assembly 17 now being located at the second standby station 27. Such operation of the piston and cylinder assembly 19 may be initiated by any suitable mechanism, e.g., a timing device or a facility for sensing that the screen device within the first recess 21 in the slide assembly 17 is becoming clogged.

The various mechanisms located at the second screen-changing station 27 meanwhile begin operating, in response to a screen-change signal from the limit switch 29 upon the entry of the slide assembly 17 into its second position, to replace the used screen device in the first recess 21 of the slide assembly 17, in similar manner to the described operation of the corresponding mechanisms at the first screen-changing station 26. Thus, the apparatus may continue to function with the slide assembly 17 in its second position until such time as the piston and cylinder assembly 19 may be operated to return the slide assembly 17 to its first position for replacement of the screen device in the second recess 22 of the slide assembly, completing a full cycle of operations of the apparatus.

Control of the various mechanisms in the desired timed relationship is effected by a suitable electronic circuit (not shown), which may include additional limit switches (not shown) to sense the completion of movement of the various mechanisms.

The advantages and inherent flexibility of the present invention over predecessor techniques should now be quite apparent. Thus, for example, the invention does not require the use of discrete housings or retaining rings for the screen devices; instead, the walls of the recesses 21 and 22 serve as housings. Additionally, rather than keeping many devices of different mesh sizes available, only a few spools of preform of different mesh sizes need be stored. Similarly, rather than keeping screen devices having varying numbers of elements on hand, the present invention enables a device having any number of elements to be formed, in situ, by simple adjustment of the number of indexes of the feeding mechanism 43 and actuation of the punch 54.

It is to be understood that the foregoing description is simply illustrative of a preferred embodiment of the invention. In other embodiments, the various piston and cylinder assemblies might be replaced by other, equivalent devices for operating the various mechanisms of the apparatus. Many other modifications may, of course, also be made in accordance with the principles of the invention.

What is claimed is:

1. The method of replacing the used screen devices of a screen mechanism employed to screen the extrudate of a plastics extruder, the screen mechanism having at least first and second screen receiving recesses and being movable between a first and second position, in the first position, the first recess being outside of the path of the extrudate at a first standby station while the second recess is in the path of the extrudate and, in the second position, the second recess being outside of the path of the extrudate at a second standby station while the first recess is in the path of the extrudate, which method comprises the steps of:
   (a) moving the screen mechanism to the first position to position the first recess at the first standby station;
   (b) removing any used screens from the first recess at the first standby station;
   (c) feeding a first elongated carrier having a plurality of screen elements connected thereto into the first standby station such as to align one of the screen elements thereof with the first recess when the first recess is positioned in the first standby station;
   (d) removing an aligned screen element from the first carrier strip;
   (e) inserting the screen element removed in step (d) into the first recess;
   (f) moving the screen mechanism to the second position to position the second recess at the second standby station;
   (g) removing any used screen devices from the second recess at the second standby station;
   (h) feeding a second elongated carrier having a plurality of screen elements connected thereto into the second standby station such as to align one of the screen elements thereof with the second recess when the second recess is positioned in the second standby station;
   (i) removing the aligned screen element from the second carrier strip; and
   (j) inserting the screen element removed in step (i) into the second recess.

2. The method of claim 1, wherein steps (d) and (e) are performed by a punching operation in which a punch aligned with both the aligned screen element and the first recess first punches the aligned screen element to detach it from the carrier strip and then inserts the removed element into the first recess and wherein steps (i) and (j) are performed by a punching operation in which a punch aligned with both the aligned screen element and the second recess first punches the aligned screen element to detach it from the carrier strip and then inserts the removed element into the second recess.

3. The method of claim 2, wherein each screen element includes a plurality of tabs having first and second end, the first ends being integral with the screen element and the second ends of some of the tabs being connected to the carrier strip and the second ends of the other of the tabs being attached to the next adjacent screen element, and wherein the aligned screen element is detached from the strip by severing the tabs associated therewith at their second ends.

4. The method of claim 3, wherein each screen element includes a circular, central portion and the tabs radiate from the periphery thereof.

5. The method of claim 4, wherein the recesses and the elements are similarly shaped and dimensioned such that the tabs of the element are bent during insertion to thereby retain the element within a recess by spring action.

6. Apparatus for replacing the used screens of a screen mechanism employed to screen the extrudate of a plastics extruder, the screen mechanism having at least first and second screen receiving recesses and being movable between a first and second position, in the first position, the first recess being outside of the path of the extrudate at a first standby station while the second recess is in the path of the extrudate and, in the second position, the second recess being outside of the path of the extrudate at a second standby station while the first recess is in the path of the extrudate, which apparatus comprises:
   (a) means for feeding a first elongated carrier having a plurality of screen elements connected thereto into the first standby station such as to align one of the screen elements thereof with the first recess when the first recess is positioned in the first standby station;
   (b) means for removing an aligned screen element from the first carrier strip and for inserting the aligned screen element into the first recess;
   (c) means for feeding a second elongated carrier having a plurality of screen elements connected thereto into the second standby station such as to align one of the screen elements thereof with the second recess when the second recess is positioned in the second standby station; and
   (d) means at the second standby station for removing an aligned screen element from the second carrier strip for inserting the aligned screen element into the second recess.

7. Apparatus in accordance with claim 6, wherein means (b) and (d) include first and second punch and die assemblies, positioned respectively at the first and second standby stations such as to be aligned with the recesses when the recesses are in their respective standby stations.

8. Apparatus in accordance with claim 7, wherein each carrier includes a pair of slots associated with each element and wherein each feeding means includes a pair of plungers, movable, in a direction transverse to the direction of feed of the carrier strip, into the slots to engage the carrier, and then movable along the direction of feed to feed the carrier.

9. Apparatus in accordance with claim 8, further comprising:
   (e) means for chopping the first carrier after an element is removed therefrom; and
   (f) means for chopping the second carrier after an element is removed therefrom.

* * * * *